(12) United States Patent
Olander et al.

(10) Patent No.: US 7,337,713 B1
(45) Date of Patent: Mar. 4, 2008

(54) BALE WRAPPING PATTERN CONTROLLER AND METHOD

(75) Inventors: Brian D. Olander, Hesston, KS (US); Maynard M. Herron, Hesston, KS (US); Charlie O. James, Newton, KS (US); Robert J. Waggoner, Hesston, KS (US); Roger A. White, Newton, KS (US)

(73) Assignee: AGCO Corporation, Duluth, GA (US)

( * ) Notice: Subject to any disclaimer, the term of this patent is extended or adjusted under 35 U.S.C. 154(b) by 0 days.

(21) Appl. No.: 11/461,566

(22) Filed: Aug. 1, 2006

(51) Int. Cl.
*B65B 13/04* (2006.01)
*B65B 63/04* (2006.01)

(52) U.S. Cl. ............... 100/4; 100/2; 100/5; 100/13; 100/88; 53/587

(58) Field of Classification Search ............ 100/2, 100/4, 5, 13, 76, 88, 89; 53/118, 176, 211, 53/399, 587–589, 590; 56/341, 344, DIG. 2
See application file for complete search history.

(56) References Cited

U.S. PATENT DOCUMENTS

| | | | |
|---|---|---|---|
| 4,174,661 A | 11/1979 | Mathes et al. |
| 4,248,143 A | 2/1981 | Gaeddert |
| 4,253,387 A | 3/1981 | Schmitt et al. |
| 4,386,561 A | 6/1983 | Viaud et al. |
| 4,402,259 A | 9/1983 | Viaud |
| 4,437,399 A | 3/1984 | Koning |
| 4,440,075 A | 4/1984 | Gaeddert |
| 4,446,783 A | 5/1984 | Illy |
| 4,457,226 A | 7/1984 | Meiers |
| 4,502,646 A | 3/1985 | Meiers |
| 4,647,243 A | 3/1987 | Koning |
| 4,677,807 A | 7/1987 | Verhulst et al. |
| 4,787,193 A | 11/1988 | Verhulst et al. |
| 4,793,249 A | 12/1988 | Wellman |
| 4,796,524 A | 1/1989 | Renaud |
| 4,800,811 A | 1/1989 | Wellman |
| 4,998,961 A | 3/1991 | Anderson et al. |
| 5,170,701 A | 12/1992 | Viaud |
| 5,631,826 A | 5/1997 | Chow |
| 5,709,143 A | 1/1998 | Bentley |
| 5,816,038 A | 10/1998 | Anderson et al. |
| 5,894,790 A | 4/1999 | Viaud |
| 5,941,166 A | 8/1999 | Geiser |
| 5,950,530 A | 9/1999 | Clauss et al. |
| 6,016,646 A | 1/2000 | Taylor et al. |

(Continued)

*Primary Examiner*—Jimmy T. Nguyen
(74) *Attorney, Agent, or Firm*—Hovey Williams LLP

(57) ABSTRACT

A bale wrapping control system that enables several custom bale wrapping patterns which more effectively wrap and maintain the integrity of bales formed in a round baler. The bale wrapping control system controls operation of a dispensing arm which dispenses twine or other bale wrapping material. The dispensing arm is moveable between a start position where an end of the dispensing arm is closest to the bale, a left edge position where the end of the dispensing arm is near a left edge of the bale, a right edge position where the end of the dispensing arm is near a right edge of the bale, and a cutoff or home position where the end of the dispensing arm passes a cutting mechanism. The bale wrapping control system includes a baler controller for controlling movement of the dispensing arm and a user interface for receiving operating instructions from an operator of the baler and for controlling certain functions of the baler controller in response to the operating instructions.

34 Claims, 8 Drawing Sheets

U.S. PATENT DOCUMENTS

| | | |
|---|---|---|
| 6,035,773 A | 3/2000 | Rempe |
| 6,209,450 B1 * | 4/2001 | Naaktgeboren et al. ........ 100/4 |
| 6,446,548 B2 | 9/2002 | Chow |
| 6,453,805 B1 | 9/2002 | Viaud et al. |
| 6,675,561 B2 | 1/2004 | Davis et al. |
| 6,769,353 B1 | 8/2004 | Smith et al. |
| 6,883,422 B2 | 4/2005 | Viaud et al. |

* cited by examiner

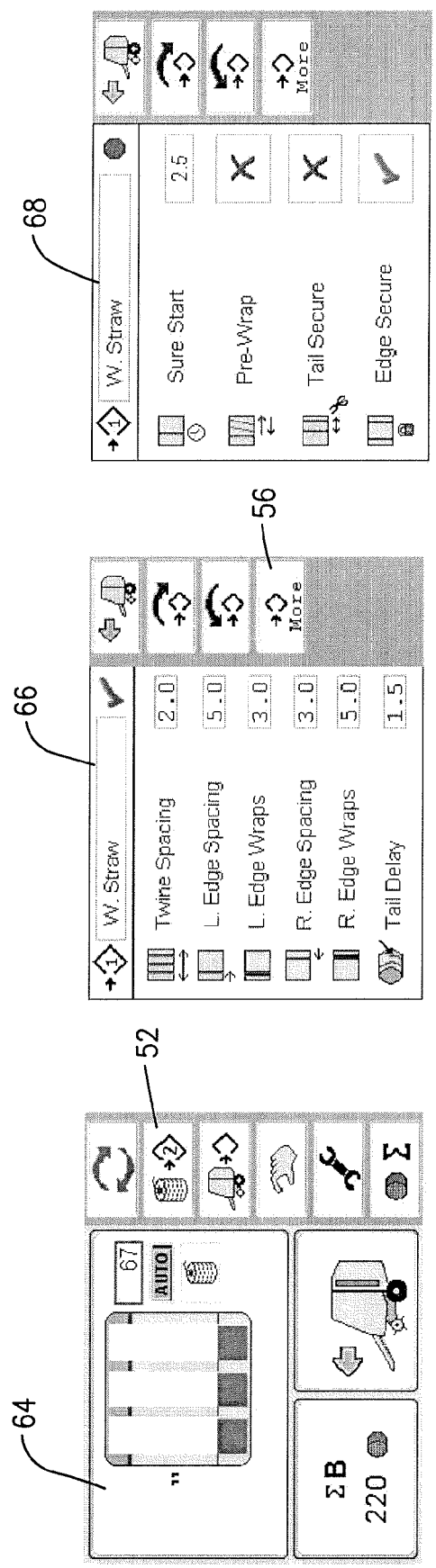

BALE WRAPPING PATTERN CONTROLLER AND METHOD

BACKGROUND OF THE INVENTION

1. Field of the Invention

The present invention relates to round balers and other baling equipment. More particularly, the invention relates to a bale wrapping control system which enables several custom bale wrapping patterns for more effectively wrapping and maintaining the integrity of bales.

2. Description of the Prior Art

Conventional round balers pick up cut crop from the ground and form it into compacted bales in a bale forming chamber. When a bale reaches a desired size and/or shape, sensors signal a controller that subsequently sends a signal to an operator's panel to instruct the operator to stop forward motion of the baler so that a bale wrapping operation can be performed. Once a bale has been formed and wrapped, it is ejected from the baler so a new bale can be formed and wrapped.

Bale wrapping is typically performed with a twine dispensing arm having one or more twine dispensing tubes and moveable in an arcuate or linear path between the left and right edges of a formed bale. After a bale has been fully formed, the dispensing arm moves the dispensing tubes adjacent the rotating bale so the ends of twine extending from the tubes are caught up in the rotating bale. Once the twine is caught up in the bale, the twine begins to wrap around the rotating bale in a helical pattern as the twine tubes move from one end of the bale to the other. The dispensing arm may periodically dwell in one position so that circular wraps are made at desired bale locations such as near the ends of the bale. After a bale has been adequately wrapped, the dispensing arm retracts to a home or cutoff position to cut the twine.

It is typically desired to minimize the number of twine wraps around a bale to conserve twine and reduce the overall wrapping time. However, some crop material and/or baling conditions require extra wraps to securely maintain the integrity of bales during subsequent handling and storage. For example, short brittle crop has a tendency to break off a bale as it is being formed and wrapped and thus requires extra wraps. Similarly, poorly formed bales (not cylindrical) may require extra wraps and/or special wrapping patterns to prevent twine slippage. Prior art attempts have been made to provide custom bale wrapping patterns to more securely wrap bales; however, known bale wrapping patterns do not adequately wrap bales in many conditions.

Accordingly, there is a need for an improved bale wrapping system and method that overcomes the limitations of the prior art.

SUMMARY OF THE INVENTION

The present invention solves the above-described problems and provides a distinct advance in the art of bale wrapping control systems for round balers and other baling equipment. More particularly, the present invention provides a bale wrapping control system that enables several custom bale wrapping patterns to more effectively wrap and maintain the integrity of bales.

The bale wrapping control system of the present invention controls operation of a baler dispensing arm which dispenses twine or other bale wrapping material. The dispensing arm is moveable between a start position where an end of the dispensing arm is closest to the bale, a left edge position where the end of the dispensing arm is near a left edge of the bale, a right edge position where the end of the dispensing arm is near a right edge of the bale, and a cutoff or home position where the end of the dispensing arm passes a cutting mechanism. The bale wrapping control system includes a baler controller for controlling movement of the dispensing arm and a user interface for receiving operating instructions from an operator of the baler and for controlling certain functions of the baler controller in response to the operating instructions.

In one embodiment, the user interface is programmed to direct the controller to perform a sure start mode which ensures that the twine or other wrapping material gets caught up in the rotating bale before the dispensing arm begins to wrap the ends of the bale. In the sure start mode, the baler controller moves the dispensing arm to the start position (the start position typically corresponds to the center of the bale) and then pauses until the bale has been wrapped with a selected number of wraps at the start position. Thereafter, the baler controller moves the dispensing arm to the left edge position and then the right edge position to apply the left and right edge wraps. The sure start mode provides two primary benefits. First, by stopping the dispensing arm when it is closest to the rotating bale, the twine has the greatest chance of getting caught up in the bale, resulting in more reliable twine starting. Second, by pausing the dispensing arm in the sure start position for several wraps, the twine is already tight around the bale by the time the edge wraps are started, resulting in tighter edge wraps which are less likely to fall off the edges of the bale after the bale has been ejected.

In another embodiment, the user interface is programmed to direct the controller to perform a pre-wrap mode which prevents a bale from deteriorating during the bale wrapping process. Short, brittle crop material has a tendency to break off a bale as the bale rotates in the baling chamber. The pre-wrap mode quickly places a containing wrap across the entire width of the bale before any end wraps are made and before normal spacing wraps are applied to prevent bale deterioration during subsequent wrapping. In addition to preventing bale deterioration, the pre-wrap mode results in tighter edge wraps.

In another embodiment, the user interface is programmed to direct the controller to perform a edge secure mode to prevent or minimize migration of the left edge wraps on a bale. Twine has a tendency to migrate from its original position on the bale as the bale turns in the bale forming chamber. The edge secure mode places the left edge wraps on the bale near the end of a bale wrapping procedure rather than at the beginning. By putting on the edge wraps last, they don't encounter as many revolutions inside the bale chamber, thus reducing twine migration. This reduces problems associated with twine falling off the bale.

In another embodiment, the user interface is programmed to direct the controller to perform a tail secure mode which reduces the chances of the twine tail catching on something or unraveling after the bale has been ejected from the baler. The tail secure mode moves the loose tail end of the twine closer to the middle of the bale so that it is out of the way of any transport mechanisms used to move the bale after it has been fully formed, wrapped, and ejected.

These and other important aspects of the present invention are described more fully in the detailed description below.

BRIEF DESCRIPTION OF THE DRAWING FIGURES

A preferred embodiment of the present invention is described in detail below with reference to the attached drawing figures, wherein:

FIG. 8 is a sample screen display of the user interface.

FIG. 9 is another sample screen display of the user interface.

FIG. 10 is yet another sample screen display of the user interface.

Figure 1:
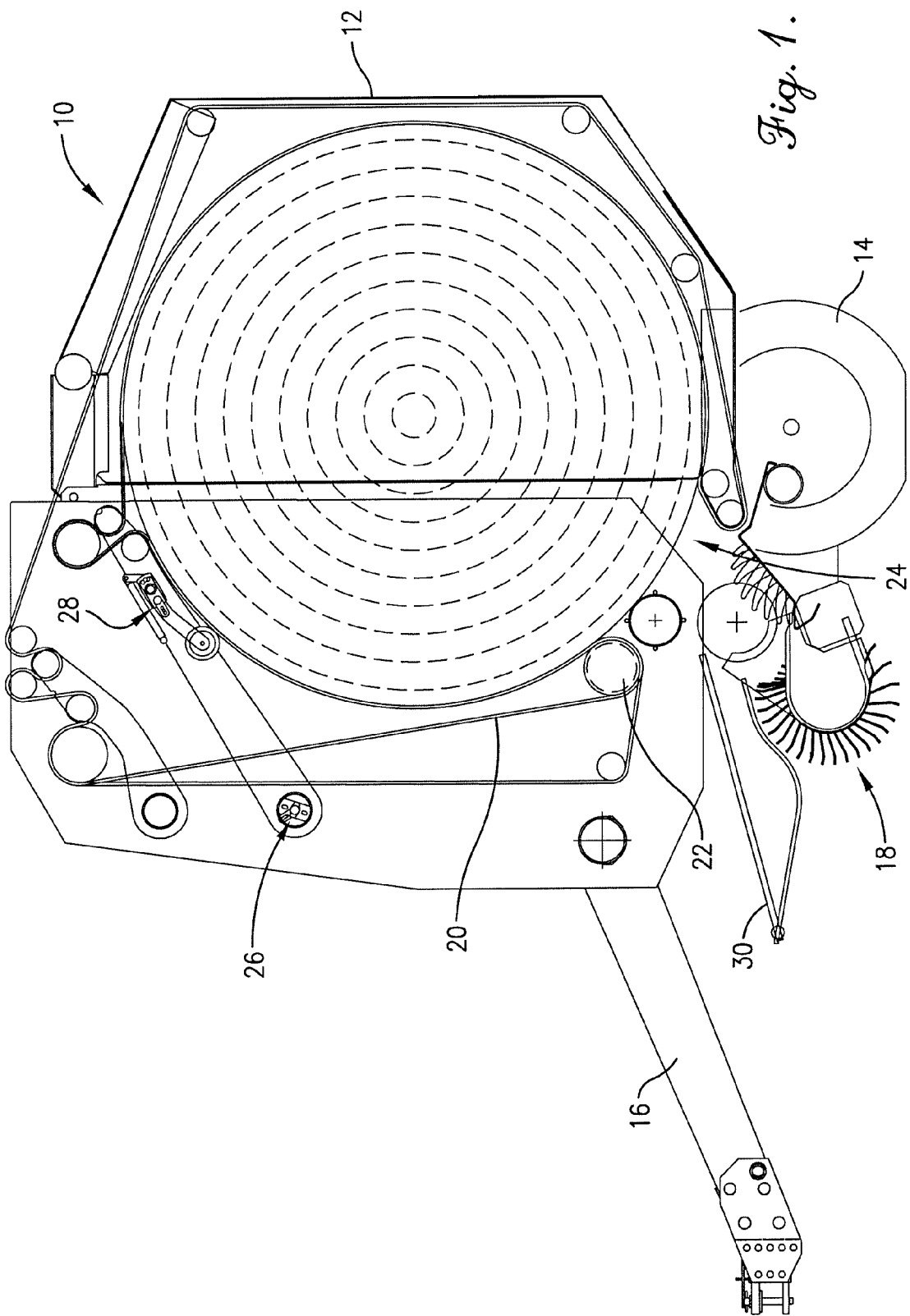
FIG. 1 is a schematic, side elevational illustration of a rotary baler with a near sidewall thereof removed to reveal mechanisms within the baler.
Figure 2:
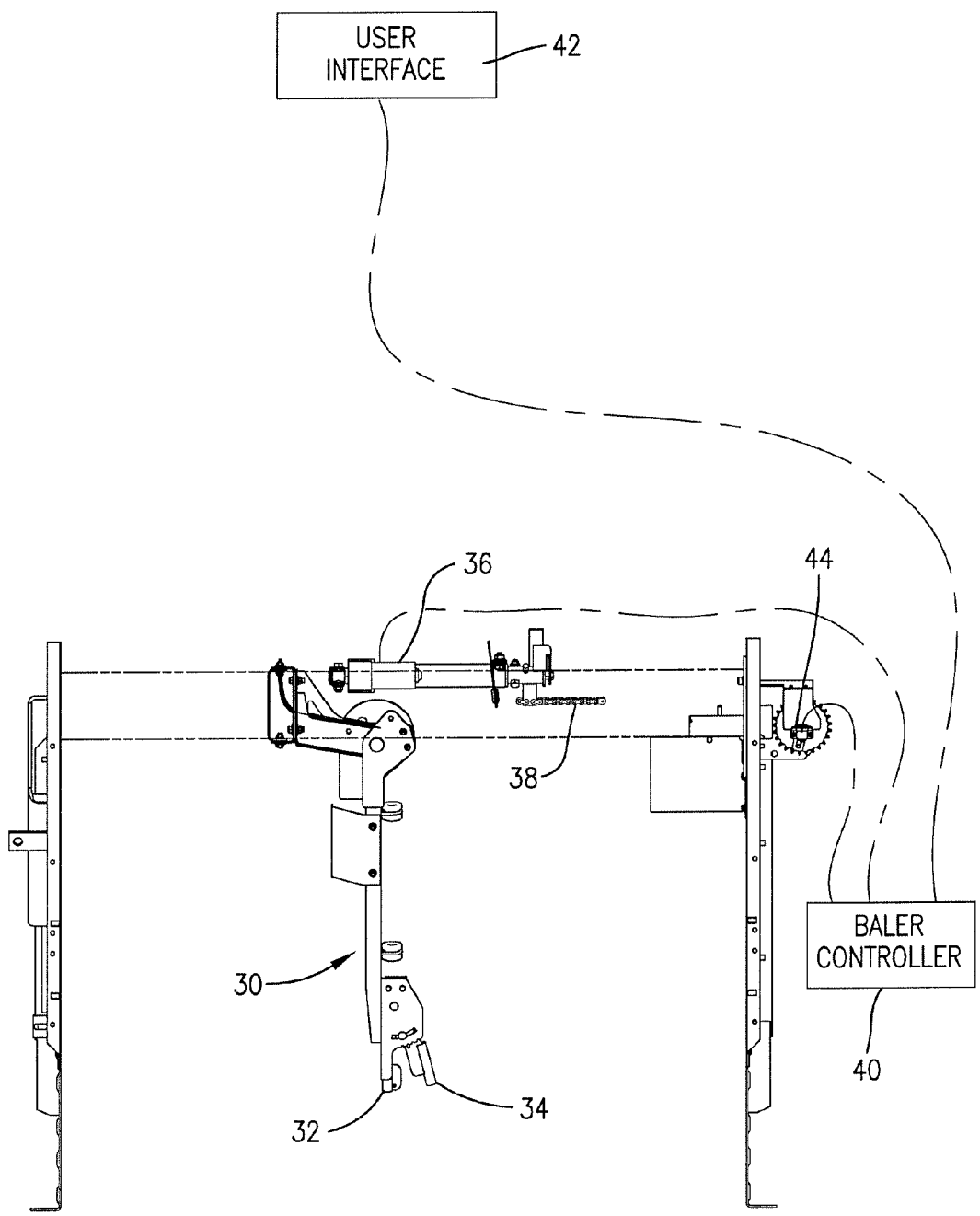
FIG. 2 is a schematic plan view illustration of a twine dispensing mechanism and bale wrapping control system of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE PREFERRED EMBODIMENTS

The present invention is susceptible of embodiment in many different forms. While the drawings illustrate and the specification describes certain preferred embodiments of the invention, it is to be understood that such disclosure is by way of example only. There is no intent to limit the principles of the present invention to the particular disclosed embodiments.

The present invention is preferably incorporated as part of a round baler 10 such as the 900 series round balers manufactured by Agco Corporation including the Hesston 945, 955, 956, 946A, 956A, New Idea 6454, 6464, 6465, and Challenger RB45, RB46 and RB56 round balers; however, the invention may be incorporated as a part of other types of baling equipment such as fixed chamber balers, square balers, etc. Referring to FIG. 1, the preferred baler 10 includes a pair of laterally spaced apart sidewalls 12 (only one being shown) carried by ground wheels 14 (only one being shown) for advancement across a field in response to pulling force supplied to a generally fore-and-aft extending tongue 16 at the front of the sidewalls. A suitable power transmission device (not shown) incorporated as part of baler 10 is normally connected to the power-take off shaft of a tractor or other vehicle towing baler 10 for thereby supplying driving power to the various moving components of baler 10 including a crop pickup 18 thereof which may be of conventional design.

Because the sidewalls are laterally spaced-apart respective to the normal path of travel of the baler 10, room is provided therebetween for formation and transport of a bale of crop formed by material which is picked up and loaded into the space between the sidewalls by pickup 18. Hence, the sidewalls cooperate in part to define a baling chamber. The fore-and-aft limitations of the baling chamber are defined by opposed, initially generally vertically disposed stretches of an endless, flexible web means broadly denoted by the numeral 20 and preferably comprising a series of endless, side-by-side, flexible rubber belt elements having their respective longitudinal axes disposed in a plane parallel to the sidewalls.

The endless belts 20 are looped around a number of cylindrical rolls spanning the distance between the sidewalls. For example, a roll 22 adjacent the lower front end of baling chamber may be driven by the output of the power transmission mechanism (not shown) so as to provide motive force for driving the endless belts 20 longitudinally of themselves. The other rolls may be idlers. The bottom of the baling chamber is open to present a crop inlet 24 for the pickup 18.

The round baler 10 also includes a bale size signal sensor 26 which is preferably a rotary hall-effect sensor such as those manufactured by Power Components in Mishawaka, Ind. The bale size sensor 26 includes a rotation element which is coaxially mounted to one end of a mounting shaft to produce an electrical signal corresponding to the rotational position of the shaft, which position is representative of the size of the bale being formed in the baling chamber.

The round baler 10 also preferably includes one or more bale shape signal mechanisms 28. The bale shape signal mechanisms 28 are mounted in association with corresponding belt elements to sense the shape of a bale as it is being formed. Other details of round balers which may be used with the present invention are described in U.S. Pat. Nos. 6,477,824; 6,675,561; 4,850,271; and 4,224,867, all incorporated into the present application by reference.

As best illustrated in FIGS. 1-6, the round baler 10 also includes a twine dispensing arm 30 which dispenses twine or other wrapping material for wrapping bales formed in the bale forming chamber. The twine dispensing arm 30 preferably has two twine tubes 32, 34 and is pivotally mounted to a pivot point at the front of the baler 10. The twine dispensing arm 30 is mechanically controlled by a 12V linear actuator 36 coupled to the arm by a drive chain and sprocket 38. When the actuator 36 retracts, the end of the twine arm 30 moves to the right side of the baler. When the actuator extends, the twine arm moves to the left side of the baler.

Figure 3:
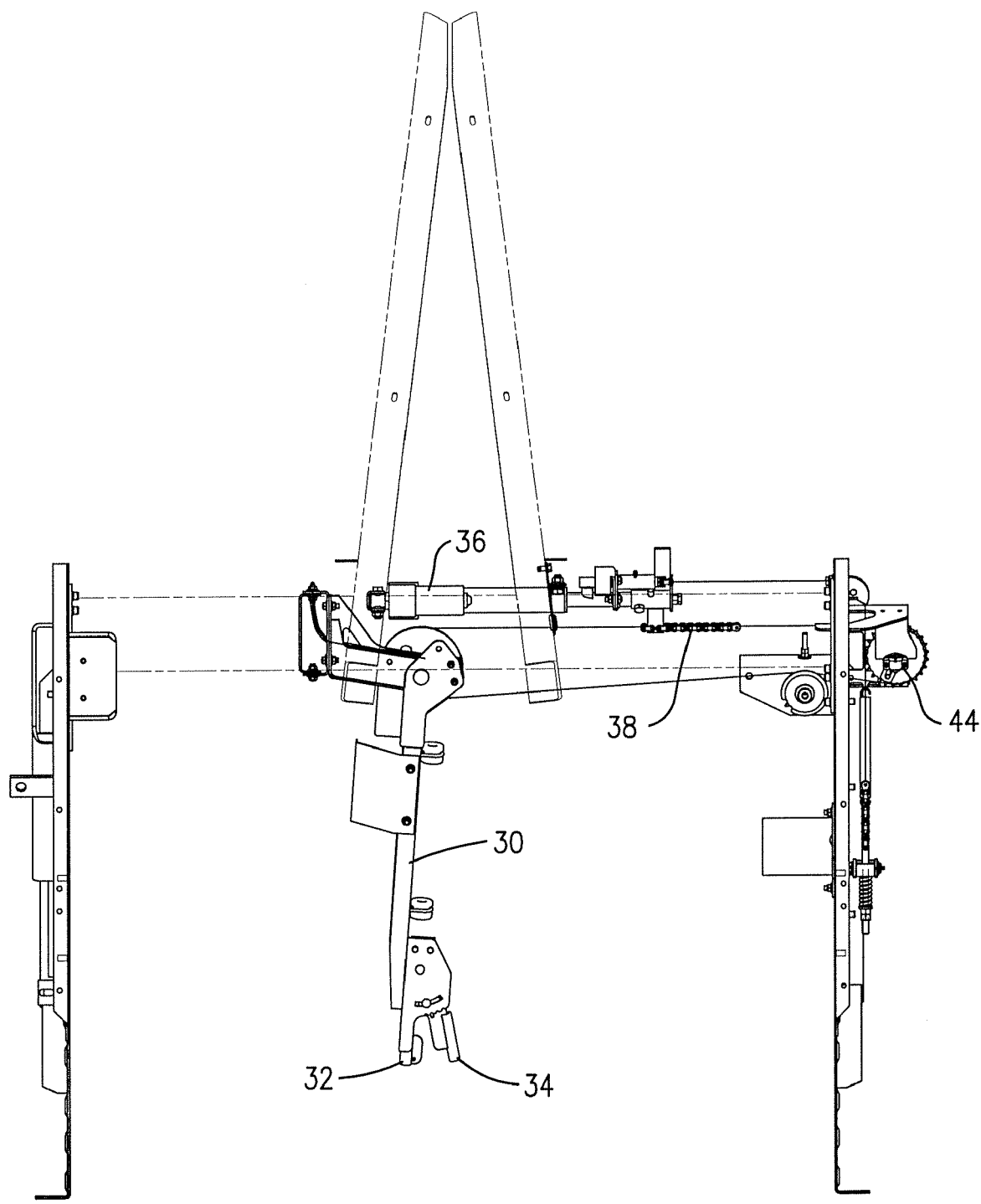
FIG. 3 is a schematic plan view illustration of the twine dispensing mechanism shown in a start position.
Figure 4:
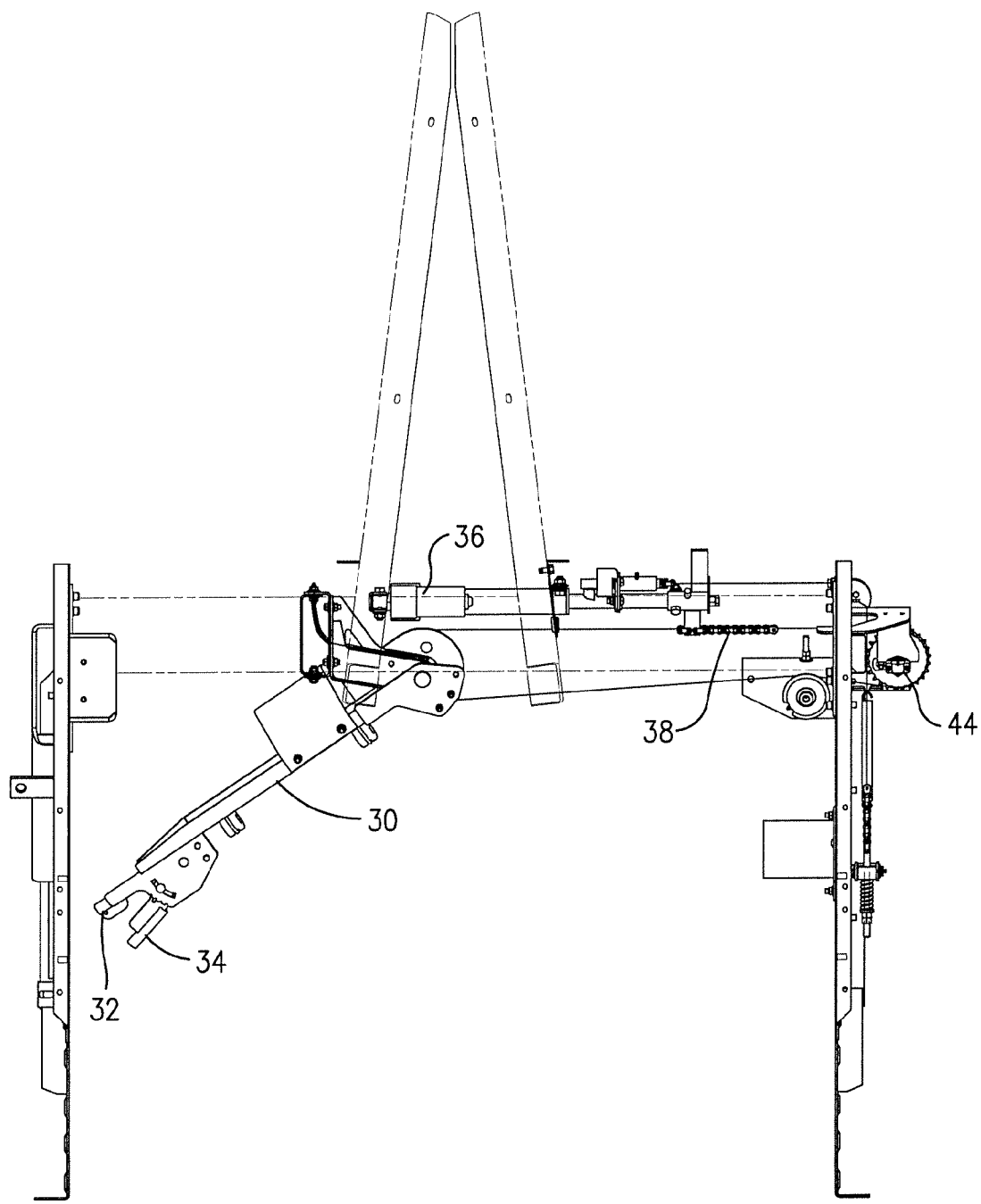
FIG. 4 is a schematic plan view illustration of the twine dispensing mechanism shown in a left edge position.
Figure 5:
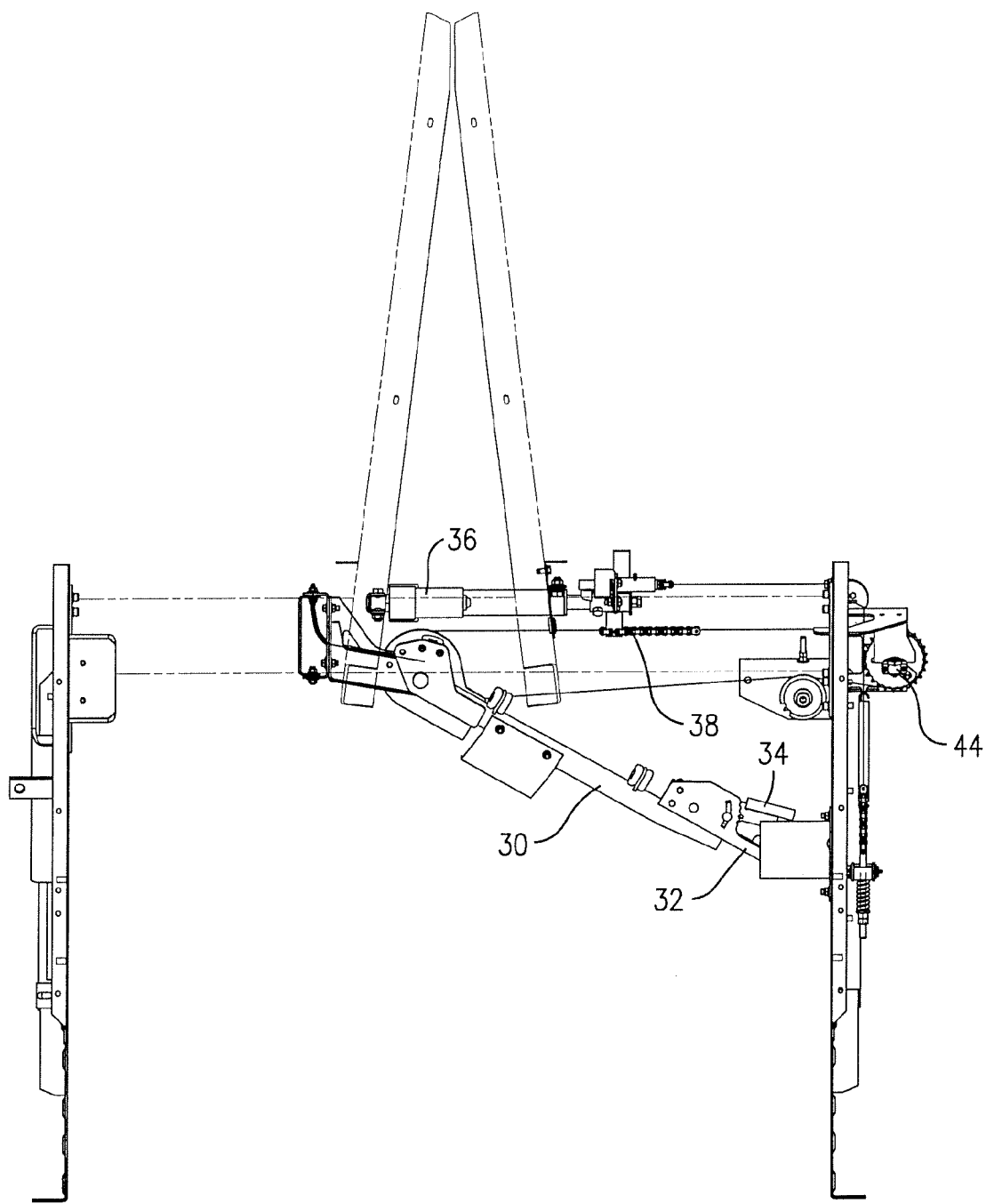
FIG. 5 is a schematic plan view illustration of the twine dispensing mechanism shown in a right edge position.
Figure 6:
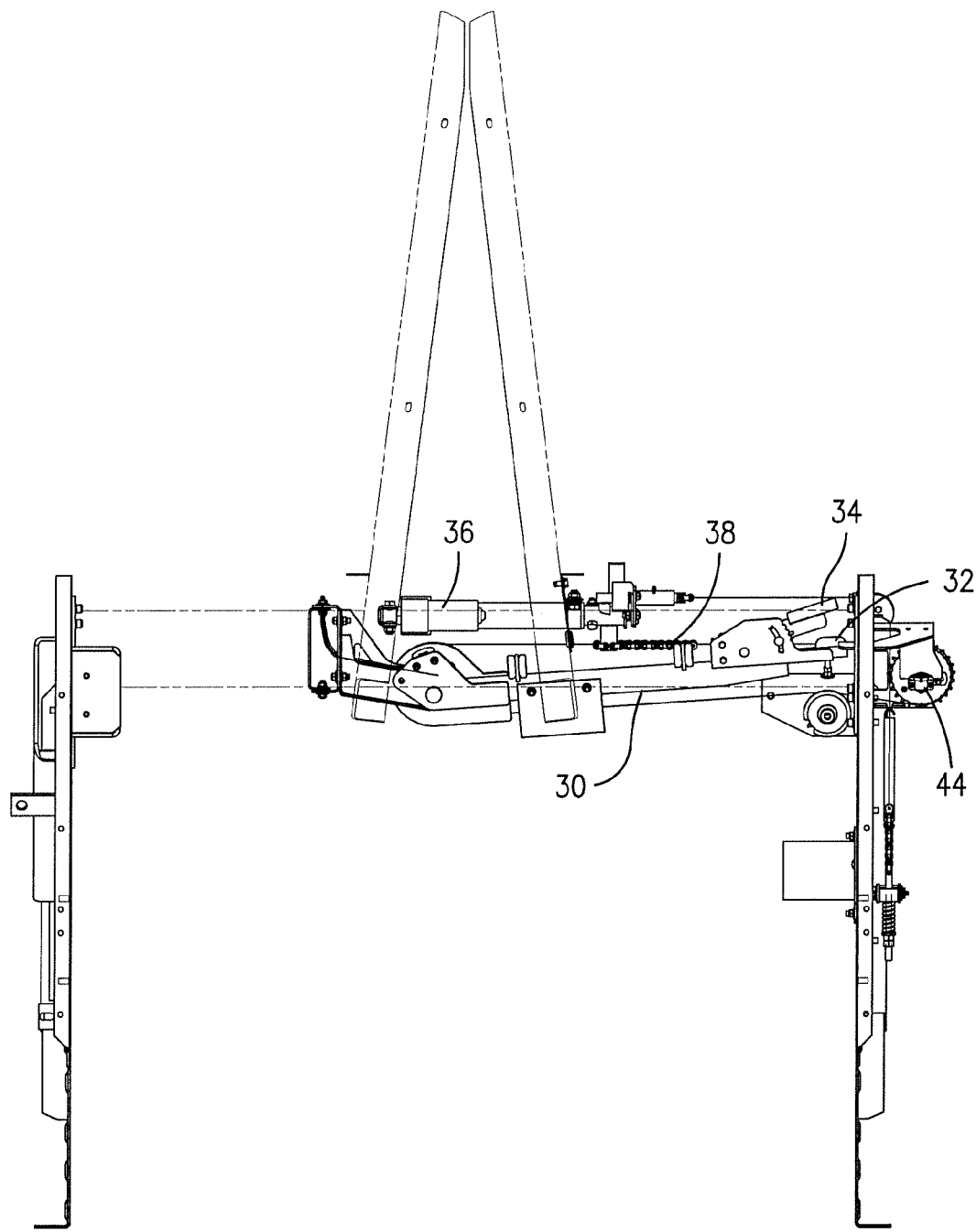
FIG. 6 is a schematic plan view illustration of the twine dispensing mechanism shown in a home or cutoff position.

The dispensing arm 30 is moveable between a start position illustrated in FIG. 3 where an end of the dispensing arm is closest to the bale, a left edge position illustrated in FIG. 4 where the end of the dispensing arm is near a left edge of the bale, a right edge position illustrated in FIG. 5 where the end of the dispensing arm is near a right edge of the bale, and a cutoff or home position illustrated in FIG. 6 where the end of the dispensing arm passes a cutting mechanism.

The bale wrapping control system of the present invention controls operation of the twine dispensing arm 30 and includes a baler controller 40 positioned on or near the round baler 10 and a user interface 42 preferably positioned in the tractor or other vehicle towing the baler 10. Although the baler controller 40 and the user interface 42 are preferably separate components, their functions may also be combined into a single unit positioned either on the baler 10 or its towing vehicle.

The baler controller 40 controls the linear actuator 36 and thus the movement of the dispensing arm 30 between the start, left edge, right edge, and cut-off positions. A rotary position sensor 44 coupled to the twine arm 30 and actuator 36 through the drive chain and an idler sprocket 38 feeds twine arm position information to the baler controller 40. Twine running wheels sense how much twine is being applied to the bale. The bale size sensor 26 mentioned above determines bale size and provides a corresponding signal to the user interface 42 through the baler controller 40. The direction of actuator travel is determined by the baler controller 40 through an electro-mechanical relay. The speed of actuator travel is determined by the baler controller 40 using pulse width modulation (PWM) through a solid-state relay.

When the actuator 36 is operated without any PWM, the dispensing arm 30 moves at full speed. The preferred linear actuator has an eight-inch stroke. With no load, the actuator extends or retracts at approximately two inches per second. Therefore, the twine arm can theoretically move between its left and right edge positions in four seconds. Twine tension puts a load at the end of the arm that slows the actuator slightly.

In one embodiment, the bale forming belts on the baler are traveling at 462 feet per minute at rated tractor PTO speed. A six foot diameter bale will turn inside the forming chamber at 24 rpm. The result is that the twine arm 30 moving at full speed will put almost 1.75 wraps of twine around a rotating bale. This cannot be translated to an exact distance between twines because, as the twine arm 30 moves throughout its arc, the transverse twine spacing on the bale will vary with the cosine of the angle that the twine arm makes with the baler.

When the dispensing arm 30 is putting on the standard spacing wraps, the baler controller 40 calculates where the arm 30 should be at any given point in time, based on the twine spacing that the operator has set. The controller 40 compares where it thinks the arm 30 should be to the information coming from the twine arm position sensor 44 and increases or decreases the PWM as required to hit the desired values.

Anytime the dispensing arm 30 pauses to place multiple wraps of twine around the bale at one position, as described in more detail below, the baler controller 40 uses the size of the bale and the amount of twine applied to determine how long to pause in that position.

There are five set positions where the twine dispensing arm 30 will pause. The sure start position (also referred to herein as "start position"), shown in FIG. 3, is the position where the end of the dispensing arm 30 is closest to the bale. This position is dependent on the twine arm geometry and is hard coded in the controller 40. The left edge and right edge positions, shown in FIGS. 4 and 5 respectively, are where the dispensing arm 30 will stop at each end of the bale to place multiple wraps of twine around the bale. The edge locations are set by the operator as a distance from the end of the bale as discussed in more detail below. The tail secure position is the position where the dispensing arm 30 stops moving near the center of the bale to place the tail end of the twine away from the edge of the bale. The cutoff position is past the right edge position and is shown in FIG. 6. In the cutoff position, the actuator 36 is fully retracted and the twine should have cut off. The baler controller 40 uses information from the twine position sensor 44 to stop the dispensing arm 30 at these specific positions during custom bale wrapping patterns as described below.

The user interface 42 receives inputs from an operator of the tractor and provides corresponding instructions to the baler controller 40. The user interface 42 is preferably a baler control console that is compatible with ISO 11783 standards so that it can be used to control operation of any implement used with the tractor or other towing vehicle. The user interface 42 is programmed with a computer program comprising an ordered listing of executable instructions for implementing logical functions of the user interface 42 and baler controller 40. The computer program can be embodied in any computer-readable medium for use by or in connection with an instruction execution system, apparatus, or device, such as a computer-based system, processor-containing system, or other system that can fetch the instructions from the instruction execution system, apparatus, or device, and execute the instructions. In the context of this application, a "computer-readable medium" can be any means that can contain, store, communicate, propagate or transport the program for use by or in connection with the instruction execution system, apparatus, or device. The computer-readable medium can be, for example, but not limited to, an electronic, magnetic, optical, electro-magnetic, infrared, or semi-conductor system, apparatus, device, or propagation medium. More specific, although not inclusive, examples of the computer-readable medium would include the following: an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM). The computer-readable medium could even be paper or another suitable medium upon which the program is printed, as the program can be electronically captured, via for instance, optical scanning of the paper or other medium, then compiled, interpreted, or otherwise processed in a suitable manner, if necessary, and then stored in a computer memory.

Figure 7:
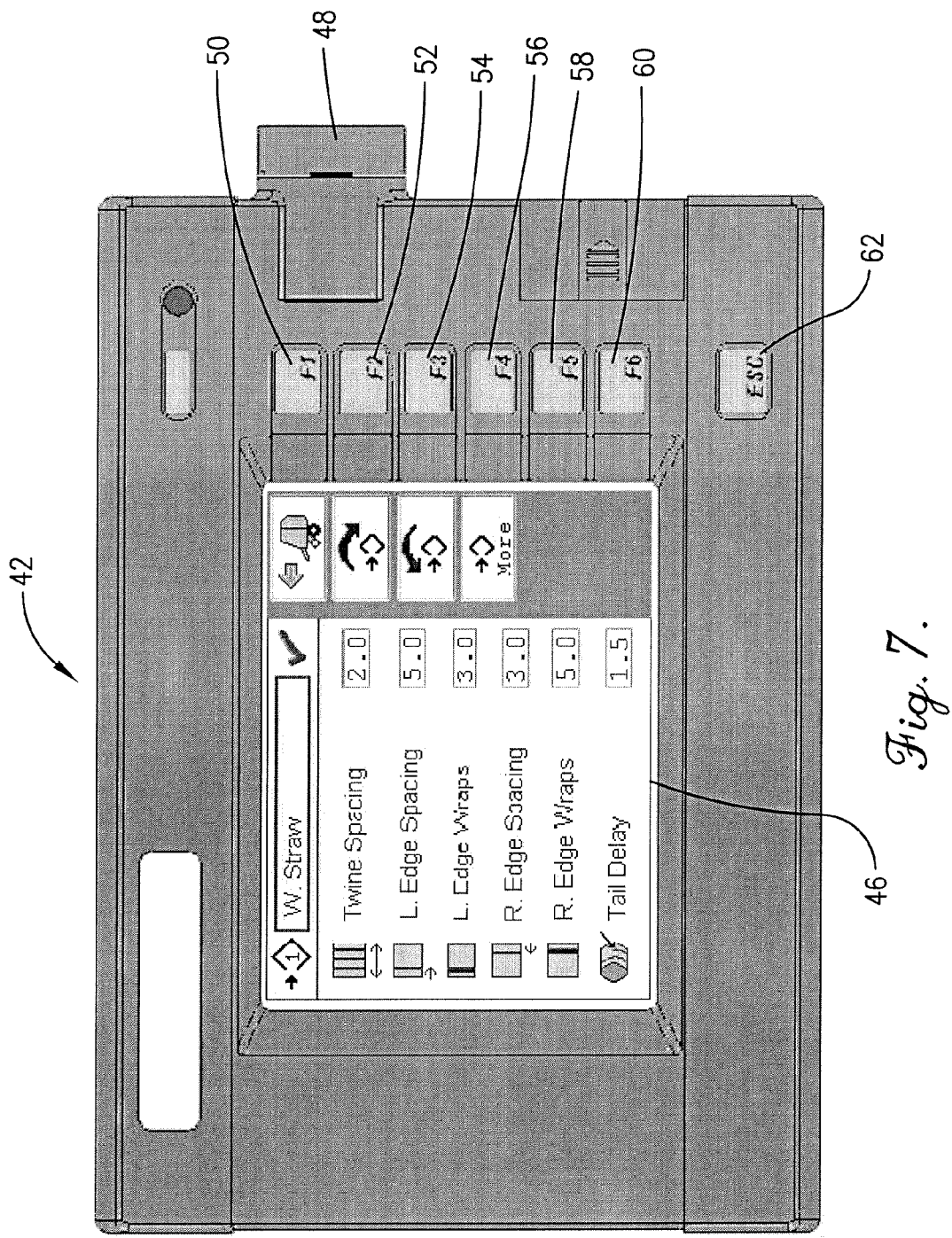
FIG. 7 is a schematic illustration of the user interface of the bale wrapping control system.

As best illustrated in FIG. 7, a preferred embodiment of the user interface 42 includes a display screen 46, a control knob 48, a plurality of function keys 50, 52, 54, 56, 58, 60 or other inputs, and an escape key 62. The user interface 42 is preferably connected to the tractor key switch so that it automatically turns on when the tractor key is used to start the tractor. The control knob 48 allows the user to scroll through the functions shown on the display screen and select one of the functions when the knob is pressed. The function keys 50, 52, 54, 56, 58 enable a displayed function or cause display of another screen. The particular operation or function of each function key is determined by the computer program on the user interface 42 and can be changed. The escape key 62 may be pressed once to acknowledge an alarm or pressed twice to switch between work screens and setup screens.

The user interface 42 permits an operator to select a twine wrapping pattern, the amount of twine spacing, the number of left edge wraps, the distance or spacing of the twine wraps from the left edge of the bale, the number of right edge wraps, and the distance or spacing of the twine wraps from the right edge of the bale. In accordance with one important aspect of the present invention, the user interface is programmed to permit the user to select a bale wrapping pattern from a standard mode, a sure start mode, a pre-wrap mode, an edge secure mode, and a tail secure mode.

When the user interface 42 is first turned on, it displays the work screen 64 shown in FIG. 8. The work screen displays graphics indicating the status of certain implements of the tractor such as the round baler 10.

From the work screen 64, the operator may press the function key 52 to display a twine settings screen 66 shown in FIG. 9. The twine settings screen 66 allows the operator to select the overall twine spacing on the bale, the spacing of twine wraps from the left edge of a bale, the number of left edge wraps on the bale, the spacing of twine wraps from the right edge of the bale, and the number of right edge wraps on the bale.

Once the various twine settings have been selected on the twine settings screen 66, the operator may press the function key 56 to display a custom twine wrapping pattern screen 68 shown in FIG. 10. The operator uses this screen 68 to turn the sure start, pre wrap, edge secure, and tail secure wrapping patterns on or off. Each of these bale wrapping patterns and the standard mode is now described in more detail.

Standard Mode

The standard mode uses the least amount of twine and is usually adequate to get a well-wrapped bale. In the standard mode, when a bale wrapping cycle is started, the baler controller 40 instructs the dispensing arm 30 to move full speed from the cutoff position shown in FIG. 6 to the left edge position shown in FIG. 4. On the way to the left edge, if the bale has not grabbed the twine by the time the arm is in the sure start position shown in FIG. 3, the operator can instruct the user interface 42 to instruct the controller 40 to pause the dispensing arm for up to five seconds in that position to give the twine a chance to get started. If the twine has started wrapping the bale by the time the dispensing arm 30 has reached the sure start position, the baler controller 40 instructs the dispensing arm 30 to continue full speed to the left edge position shown in FIG. 4. The controller 40 then instructs the dispensing arm 30 to pause at the left edge position until the selected number of wraps has been applied to the bale. The controller 40 next instructs the dispensing arm 30 to move slowly back to the right edge making adjustments to place twine at the set spacing as necessary. When the arm reaches the right edge position shown in FIG. 5, the controller 40 instructs it to pause to place the right edge wraps on the bale. After the right edge wraps are applied, the controller 40 moves the dispensing arm 30 full-speed to the cutoff position shown in FIG. 6.

Sure Start Mode

If the operator is having difficulty getting twine to start in the standard mode, he may enable the sure start mode to pause the dispensing arm 30 longer at the sure start position to give the bale more of an opportunity to grab the twine tails coming out of the arm. Also, if the operator feels that the left edge wraps are not tight on the bale, increasing sure start wraps will get the twine cinched on the bale better and result in tighter edge wraps.

In the sure start mode, the controller 40 initially moves the dispensing arm 30 from the cutoff position shown in FIG. 5 to the start position shown in FIG. 3. The controller 40 then pauses the dispensing arm 30 at the sure start position shown in FIG. 3 to wrap the bale a set number of times. The number of wraps applied in this position is set by the operator with the screen 68 shown in FIG. 10. After the sure start wraps are applied, the controller 40 continues with the selected wrapping pattern program. If pre-wrap, tail-secure, and sure-edge modes are turned off, the sure start mode reverts to the standard mode wrapping pattern described above.

Pre Wrap Mode

In conditions where the crop being baled is short and brittle, the bale in the chamber will deteriorate as it is being wrapped. This happens because short brittle crop has a tendency to break off of the bale while it is rotating in the chamber if there isn't any twine around that part of the bale yet to hold it together. This is aggravated by the fact that in these conditions, operators usually want to put twine on at a smaller spacing which means that the twine arm must move slower. This results in even more revolutions of the bale before it is wrapped all the way across, and more deterioration. The pre wrap mode places a containing wrap across the entire width of the bale to help hold the bale together before the normal spacing wraps are applied. This results in less bale deterioration while wrapping.

In the pre wrap mode, the baler controller 40 moves the dispensing arm 30 from the cutoff position shown in FIG. 6 to the sure start position shown in FIG. 3 to get the twine started. Once the twine has started (or the set number of sure start wraps have been applied if sure start is also selected), the baler controller 40 moves the dispensing arm 30 at a pre-wrap speed (in one embodiment, 75% of full speed) back to the right edge position shown in FIG. 5. After the dispensing arm 30 reaches the right edge position, the baler controller 40 moves the dispensing arm 30 at pre-wrap speed to the left edge position shown in FIG. 4. If edge secure mode is not turned on, the controller 40 pauses the dispensing arm 30 for left edge wraps, moves the dispensing arm 30 toward the right edge position for applying the standard spacing wraps, pauses the dispensing arm 30 at the right edge position for right edge wraps, and then moves the dispensing arm 30 to the cutoff position shown in FIG. 6. Since the dispensing arm 30 initially stops at the center of the bale and then reverses direction, it only goes back and forth across the bale 3 times rather than 4 times with many prior art bale wrapping patterns. This minimizes bale rotations and the total wrapping time to reduce bale deterioration.

Edge Secure Mode

Edge secure mode is used if the left edge wraps are not ending up where the left edge spacing is set. After twine is wrapped around a bale, the twine can still migrate on the bale as the bale rotates in the chamber, especially if the bale has a cone, barrel, or hourglass shape. The more a bale rotates after the twine is applied, the further the twine will migrate. This is especially troublesome with the left edge wraps, as the bale can make over 12 revolutions after the left edge wraps have been applied in the standard mode. By putting the left edge wraps on last, edge secure minimizes the amount of migration of the edge wraps, improving the edge wrap position.

Edge secure mode controls the dispensing arm 30 just like the other modes, but it skips the pause for the left edge wraps. Specifically, in the edge secure mode, the baler controller 40 initially moves the dispensing arm 30 to the sure start position shown in FIG. 3 and then pauses until the twine gets caught in the bale or pauses until the selected number of wraps have been applied to the bale if the sure start mode is enabled. The controller 40 then moves the dispensing arm 30 at full speed to the left edge position shown in FIG. 4 and pauses for one wrap at the left edge. Alternatively, the dispensing arm may not pause at the left edge. The controller then moves the dispensing arm 30 to the right edge position shown in FIG. 5 and directs the dispensing arm 30 to pause at the right edge position until the selected number of right edge wraps have been applied. After the dispensing arm 30 has paused for the right edge wraps, the controller 40 moves the dispensing arm at full speed to the left edge position and pauses there for the left edge wraps. After the left edge wraps have been applied, the controller 40 moves the dispensing arm 30 full speed back to the right edge position, pauses for one wrap, and then moves to the cutoff position.

Tail Secure Mode

The purpose of the tail secure mode is to move the loose "tail" end of the twine closer to the middle of the bale. This reduces the chances of the tail catching on something or unraveling as the bale is transported after it has been ejected from the baler 10. The tail secure mode only alters the end of the wrapping pattern. When tail secure is off, the controller 40 directs the dispensing arm to go directly from the right edge position shown in FIG. 5 to the cutoff position shown in FIG. 1. When the tail secure mode is on, the controller 40 instructs the dispensing arm to move approximately 12 inches back toward the middle of the bale after the right edge wraps have been applied. The controller 40 then pauses the dispensing arm 30 in this position for one wrap, and then moves the dispensing arm to the cutoff position.

Although the invention has been described with reference to the preferred embodiment illustrated in the attached drawing figures, it is noted that equivalents may be employed and substitutions made herein without departing from the scope of the invention as recited in the claims. For example, although the bale wrapping control system of the present invention is particularly suited for use with round balers, it may also be used with other baling equipment.

Having thus described the preferred embodiment of the invention, what is claimed as new and desired to be protected by Letters Patent includes the following:

1. A bale wrapping control system for controlling wrapping of a bale in a baler, the baler including a dispensing arm for dispensing wrapping material and being moveable between a start position where an end of the dispensing arm is close to the bale, a left edge position where the end of the dispensing arm is near a left edge of the bale, a right edge position where the end of the dispensing arm is near a right edge of the bale, and a cut-off position where the end of the dispensing arm passes a cutting mechanism, the bale wrapping control system comprising:
   a baler controller for controlling movement of the dispensing arm between the start, left edge, right edge, and cut-off positions; and
   a user interface in communication with the baler controller and programmed to direct the controller to move the dispensing arm toward the start position and then pause until the bale has begun to be wrapped at the start position.

2. The bale wrapping control system of claim 1, wherein the baler controller is configured to be positioned on the baler and the user interface is configured to be positioned on a vehicle towing the baler.

3. The bale wrapping control system of claim 1, wherein the baler controller and the user interface are a single component configured to be positioned on the baler or a vehicle towing the baler.

4. The bale wrapping control system as set forth in claim 1, wherein the user interface is operable by a user to select a selected number of wraps at the start position.

5. The bale wrapping control system as set forth in claim 4, wherein the selected number of wraps at the start position is between 1 and 10.

6. The bale wrapping control system as set forth in claim 1, wherein the start position is near a center of the bale.

7. The bale wrapping control system as set forth in claim 1, wherein the user interface is further programmed to direct the controller to move the dispensing arm, after the bale has begun to be wrapped at the start position, to a first edge position and then pause until the dispensing arm has wrapped the bale with a selected number of wraps at the first edge position.

8. The bale wrapping control system as set forth in claim 7, wherein the user interface is further programmed to direct the controller to move the dispensing arm, after the selected number of wraps has been made at the first edge position, to a second edge position and then pause until the dispensing arm has wrapped the bale with a selected number of wraps at the second edge position.

9. The bale wrapping control system as set forth in claim 8, wherein the user interface is further programmed to direct the controller to move the dispensing arm, after the selected number of wraps have been made at the second edge position, to the cut-off position so that the wrapping material may be cut.

10. The bale wrapping control system as set forth in claim 8, wherein the first edge position is the left edge position and the second edge position is the right edge position.

11. The bale wrapping control system as set forth in claim 1, wherein the wrapping material is twine.

12. A bale wrapping control system for controlling wrapping of a bale in a baler, the baler including a dispensing arm for dispensing wrapping material and being moveable between a start position where an end of the dispensing arm is close to the bale, a left edge position where the end of the dispensing arm is near a left edge of the bale, a right edge position where the end of the dispensing arm is near a right edge of the bale, and a cut-off position where the end of the dispensing arm passes a cutting mechanism, the bale wrapping control system comprising:
   a baler controller for controlling movement of the dispensing arm between the start, left edge, night edge, and cut-off positions; and
   a user interface in communication with the baler controller and programmed to direct the controller to move the dispensing arm to the start position to get the wrapping material caught up in the bale near the start position, then move the dispensing arm toward a first edge position, then move the dispensing arm toward a second edge position without first pausing at the first edge position, thus placing a containing wrap across the bale before any left edge wraps or right edge wraps are placed on the bale.

13. The bale wrapping control system as set forth in claim 12, wherein the first edge position is the edge closest to the cut-off position and the second edge position is the edge farthest from the cut-off position.

14. The bale wrapping control system as set forth in claim 13, wherein the user interface is further programmed to direct the controller to pause the dispensing arm at the start position before moving to the right edge position to place a selected number of wraps around the bale at the start position.

15. The bale wrapping control system as set forth in claim 14, wherein the user interface is operable by a user to select the selected number of wraps at the start position.

16. The bale wrapping control system as set forth in claim 15, wherein the selected number of wraps at the start position is between 1 and 10.

17. The bale wrapping control system as set forth in claim 12, wherein the user interface is further programmed to direct the controller to move the dispensing arm, after the containing wrap has been applied, to the left edge position and then pause until a selected number of left edge wraps are applied to the bale, and then to the right edge position and then pause until a selected number of right edge wraps are applied to the bale.

18. A bale wrapping control system for controlling wrapping of a bale in a baler, the baler including a dispensing arm for dispensing wrapping material and moveable between a start position where an end of the dispensing arm is close to the bale, a left edge position where the end of the dispensing arm is near a left edge of the bale, a right edge position where the end of the dispensing arm is near a right edge of the bale, and a cut-off position where the end of the dispensing arm passes a cutting mechanism, the bale wrapping control system comprising:

a baler controller for controlling movement of the dispensing arm between the start, left edge, right edge, and cut-off positions; and a user interface in communication with the baler controller and programmed to direct the controller to move the dispensing arm toward a first edge position, then move the dispensing arm toward a second edge position and pause until the bale has been wrapped with a selected number of wraps near the second edge position, then move the dispensing arm toward the first edge position and pause until the bale has been wrapped with a selected number of wraps near the first edge position.

19. The bale wrapping control system as set forth in claim 18, wherein the first edge position is the left edge position and the second edge position is the right edge position.

20. The bale wrapping control system as set forth in claim 19, wherein the user interface is operable by a user to select the selected number of wraps at the right edge position and the left edge position.

21. The bale wrapping control system as set forth in claim 20, wherein the selected number of wraps at the right edge position and the left edge position is between 1 and 10.

22. A bale wrapping system for wrapping a bale in a baler with at least one strand of wrapping material, the bale wrapping system comprising:

a dispensing arm for dispensing the wrapping material, the dispensing arm being moveable between a start position where an end of the dispensing arm is close to the bale, a left edge position where the end of the dispensing arm is near a left edge of the bale, a right edge position where the end of the dispensing arm is near a right edge of the bale, and a cut-off position where the end of the dispensing arm passes a cutting mechanism;

a baler controller for controlling movement of the dispensing arm between the start, left edge, right edge, and cut-off positions; and a user interface in communication with the baler controller and programmed to direct the controller to move the dispensing arm to the start position and then pause until the bale has begun to be wrapped at the start position.

23. The bale wrapping system as set forth in claim 22 wherein the user interface is operable by a user to select the selected number of wraps at the start position.

24. The bale wrapping system as set forth in claim 23, wherein the selected number of wraps at the start position is between 1 and 10.

25. The bale wrapping system as set forth in claim 22, wherein the start position is near a center of the bale.

26. The bale wrapping system as set forth in claim 22 wherein the user interface is further programmed to direct the controller to move the dispensing arm, after the selected number of wraps has been made at the start position, to the left edge position and then pause until the dispensing arm has wrapped the bale with a selected number of wraps at the left edge position.

27. The bale wrapping system as set forth in claim 26, wherein the user interface is further programmed to direct the controller to move the dispensing arm, after the selected number of wraps have been made at the left edge position, to the right edge position and then pause until the dispensing arm has wrapped the bale with a selected number of wraps at the right edge position.

28. The bale wrapping system as set forth in claim 27, wherein the user interface is further programmed to direct the controller to move the dispensing arm, after the selected number of wraps have been made at the right edge position, to the cut-off position so that the wrapping material may be cut.

29. A method of wrapping a bale in a baler, the baler including a dispensing arm for dispensing wrapping material and being moveable between a start position where an end of the dispensing arm is close to the bale, a left edge position where the end of the dispensing arm is near a left edge of the bale, a right edge position where the end of the dispensing arm is near a right edge of the bale, and a cut-off position where the end of the dispensing arm passes a cutting mechanism, the method comprising the steps of:

directing the dispensing arm to move to the start position and then pause until the dispensing arm has begun to wrap the bale at the start position; and after the dispensing arm has wrapped the bale with a selected number of wraps at the start position, directing the dispensing arm to move to a position selected from the group consisting of the left edge position, the right edge position, and the cutoff position to complete wrapping of the bale.

30. The method as set forth in claim 29, wherein the selected number of wraps at the start position is between 1 and 10.

31. The method as set forth in claim 29, wherein the start position is near a center of the bale.

32. The method as set forth in claim 29, further including the steps of directing the dispersing arm to move, after the selected number of wraps has been made at the start position, to the left edge position and then pause until the dispensing arm has wrapped the bale with a selected number of wraps at the left edge position.

33. The method as set forth in claim 32, further including the steps of directing the dispensing arm to move, after the selected number of wraps has been made at the left edge position, to the right edge position and then pause until the dispensing arm has wrapped the bale with a selected number of wraps at the right edge position.

34. The method as set forth in claim 33, further including the steps of directing the dispensing arm to move, after the selected number of wraps have been made at the night edge position, to the cut-off position so that the wrapping material may be cut.

* * * * *